(12) United States Patent
Wilson et al.

(10) Patent No.: US 9,886,015 B2
(45) Date of Patent: Feb. 6, 2018

(54) ADDITIVE MANUFACTURING INCLUDING LAYER-BY-LAYER IMAGING

(71) Applicant: Rolls-Royce Corporation, Indianapolis, IN (US)

(72) Inventors: Eric E. Wilson, Mooresville, IN (US); Geoffrey L. Gatton, Brownsburg, IN (US); Robert F. Proctor, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 392 days.

(21) Appl. No.: 14/642,145

(22) Filed: Mar. 9, 2015

(65) Prior Publication Data

US 2015/0261196 A1    Sep. 17, 2015

Related U.S. Application Data

(60) Provisional application No. 61/951,782, filed on Mar. 12, 2014.

(51) Int. Cl.
*G06F 19/00* (2011.01)
*G05B 15/02* (2006.01)
(Continued)

(52) U.S. Cl.
CPC .......... *G05B 15/02* (2013.01); *B22F 3/1055* (2013.01); *B29C 64/153* (2017.08);
(Continued)

(58) Field of Classification Search
CPC ........ G05B 15/02; B33Y 10/00; B33Y 50/02; B29C 67/0077; B29C 67/0088; B22F 3/1055; B22F 2003/1057; Y02P 10/295
(Continued)

(56) References Cited

U.S. PATENT DOCUMENTS 6,054,192 A * 4/2000 Otsuka .................... B29C 41/36
156/272.8
6,708,071 B1    3/2004 Turner
(Continued)

FOREIGN PATENT DOCUMENTS

EP    0856393 A3    9/1998
EP    2832473 A1    2/2015
GB    2446386 A    8/2008

OTHER PUBLICATIONS

Response to Examination Report dated Jul. 29, 2015, from counterpart European Application No. 15158124.6, filed Mar. 14, 2016, 8 pp.
(Continued)

*Primary Examiner* — Ziaul Karim
(74) *Attorney, Agent, or Firm* — Shumaker & Sieffert, P.A.

(57) ABSTRACT

In some examples, a technique includes forming, on a surface of a first layer of material, a second layer of material using an additive manufacturing process. The technique also may include imaging the second layer using a laser imaging device to generate a second layer image. Further, the technique may include determining, by a computing device, whether a thickness of the second layer, in a direction substantially normal to the surface of the first layer of material, is within a defined range of thickness for the second layer.

17 Claims, 4 Drawing Sheets

(51) Int. Cl.
  *B22F 3/105* (2006.01)
  *B33Y 10/00* (2015.01)
  *B33Y 50/02* (2015.01)
  *B29C 64/153* (2017.01)
  *B29C 64/386* (2017.01)

(52) U.S. Cl.
  CPC ............ *B29C 64/386* (2017.08); *B33Y 10/00* (2014.12); *B33Y 50/02* (2014.12); *B22F 2003/1057* (2013.01); *Y02P 10/295* (2015.11)

(58) Field of Classification Search
  USPC .......................................................... 700/119
  See application file for complete search history.

(56) References Cited

U.S. PATENT DOCUMENTS

| | | | |
|---|---|---|---|
| 6,922,599 B2 | 7/2005 | Richey | |
| 7,725,206 B2 | 5/2010 | Richey | |
| 8,064,731 B2 | 11/2011 | Zouhar et al. | |
| 8,081,180 B2 | 12/2011 | Storti et al. | |
| 8,082,052 B2 | 12/2011 | Stark et al. | |
| 8,243,334 B2 | 8/2012 | Abeloe | |
| 8,260,447 B2 | 9/2012 | Mattes et al. | |
| 8,374,714 B2 | 2/2013 | Dunne et al. | |
| 8,374,835 B2 | 2/2013 | Lind et al. | |
| 8,548,619 B2 | 10/2013 | Richey | |
| 2002/0145213 A1* | 10/2002 | Liu | B29C 67/0081 264/40.1 |
| 2005/0053275 A1 | 3/2005 | Stokes | |
| 2012/0203365 A1 | 8/2012 | Hummeler et al. | |

OTHER PUBLICATIONS

Extended European Search Report from counterpart European Application No. 15158124.6, dated Jul. 29, 2015, 7 pp.

Dunsky, "Process monitoring in laser additive manufacturing," Industrial Laser Solutions for Manufacturing, retrieved from http://www.industrial-lasers.com/articles/print/volume-29/issue-5/features/process-monitoring-in-laser-additive-manufacturing.html, Sep. 12, 2014, 7 pp.

* cited by examiner

ADDITIVE MANUFACTURING INCLUDING LAYER-BY-LAYER IMAGING

This application claims the benefit of U.S. Provisional Application No. 61/951,782, filed Mar. 12, 2014, and titled, "ADDITIVE MANUFACTURING INCLUDING LAYER-BY-LAYER IMAGING," the entire content of which is incorporated herein by reference.

TECHNICAL FIELD

The disclosure relates to additive manufacturing techniques.

BACKGROUND

Additive manufacturing generates three-dimensional structures through addition of material layer-by-layer or volume-by-volume to form the structure, rather than removing material from an existing component to generate the three-dimensional structure. Additive manufacturing may be advantageous in many situations, such as rapid prototyping, forming components with complex three-dimensional structures, or the like. In some examples, additive manufacturing may utilize powdered materials and may melt or sinter the powdered material together in predetermined shapes to form the three-dimensional structures.

SUMMARY

In some examples, the disclosure describes a method that includes forming, on a surface of a first layer of material, a second layer of material using an additive manufacturing process. The method also may include imaging the second layer using a laser imaging device to generate a second layer image. Further, the method may include determining, by a computing device, whether a thickness of the second layer, in a direction substantially normal to the surface of the first layer of material, is within a defined range of thickness for the second layer.

In some examples, the disclosure describes a method that includes delivering a powder of a material on the surface of a first layer of a component formed using an additive manufacturing process. The method also may include imaging the powder of the material using the laser imaging device to generate a powder image. Additionally, the method may include determining, by a computing device, whether the powder of the material includes a powder defect based at least in part on the powder image. Further, the method may include responsive to determining that the powder of the material includes the powder defect, performing, by the computing device, a first predetermined action, or, responsive to determining that the powder of the material does not include the powder defect, performing, by the computing device, a second predetermined action.

In some examples, the disclosure describes a method that includes sequentially forming a plurality of layers of material using an additive manufacturing process to form an as-built component. The method also may include, for each respective layer of the plurality of layers, imaging the layer using a laser imaging device to generate a respective layer image. Further, the method may include, for each respective layer of the plurality of layers, determining, by a computing device, whether a thickness of the respective layer, in a direction substantially normal to the surface of the layer of material on which the respective layer is formed, is within a defined range of thickness for the respective layer. Additionally, the method may include storing, by the computing device, the plurality of respective layer images as an image file for the as-built component.

In some examples, the disclosure describes a system including a powder delivery device, an energy delivery device, a laser imaging device, and a computing device. In accordance with this example, the computing device may be configured to control the powder delivery device to deliver powder of a material on a surface of a first layer of the material. The computing device also may be configured to control the energy delivery device to deliver energy to a volume of the powder of the material to join at least some of the powder of the material to the first layer of material and form a second layer. The computing device further may be configured to control the laser imaging device to image the second layer to generate a second layer image. In some examples, the computing device also may be configured to determine whether a thickness of the second layer, in a direction substantially normal to the surface of the first layer of material, is within a defined range of thickness for the second layer.

In some examples, the disclosure is directed to a system that includes a powder delivery device, an energy delivery device, a laser imaging device, and a computing device. The computing device may be configured to control the powder delivery device to deliver powder of a material on the surface of a first layer of a component formed using an additive manufacturing process. The computing device also may be configured to control the laser imaging device to image the powder of the material to generate a powder image and determine whether the powder of the material includes a powder defect based at least in part on the powder image. In some examples, the computing device also may be configured to, responsive to determining that the powder of the material includes the powder defect, perform a first predetermined action, or, responsive to determining that the powder of the material does not include the powder defect, perform a second predetermined action.

In some examples, the disclosure describes a computer-readable storage device including instructions that, when executed, configure one or more processors of a computing device to control a powder delivery device to deliver powder of a material on a surface of a first layer of the material. The computer-readable storage device may also include instructions that, when executed, configure one or more processors of the computing device to control an energy delivery device to deliver energy to a volume of the powder of the material to join at least some of the powder of the material to the first layer of material and form a second layer. The computer-readable storage device may further include instructions that, when executed, configure one or more processors of the computing device to control a laser imaging device to image the second layer to generate a second layer image. The computer-readable storage device may additionally include instructions that, when executed, configure one or more processors of the computing device to determine whether a thickness of the second layer, in a direction substantially normal to the surface of the first layer of material, is within a defined range of thickness for the second layer.

In some examples, the disclosure describes a computer-readable storage device including instructions that, when executed, configure one or more processors of a computing device to control a powder delivery device to deliver powder of a material on a surface of a first layer of a component formed using an additive manufacturing process. The computer-readable storage device may also include instructions that, when executed, configure one or more processors of the computing device to control a laser imaging device to image the powder of the material to generate a powder image. The computer-readable storage device may further include instructions that, when executed, configure one or more processors of the computing device to determine whether the powder of the material includes a powder defect based at least in part on the powder image. The computer-readable storage device may additionally include instructions that, when executed, configure one or more processors of the computing device to, responsive to determining that the powder of the material includes the powder defect, perform a first predetermined action, or, responsive to determining that the powder of the material does not include the powder defect, perform a second predetermined action.

The details of one or more examples are set forth in the accompanying drawings and the description below. Other features, objects, and advantages will be apparent from the description and drawings, and from the claims.

DETAILED DESCRIPTION

Figure 1:
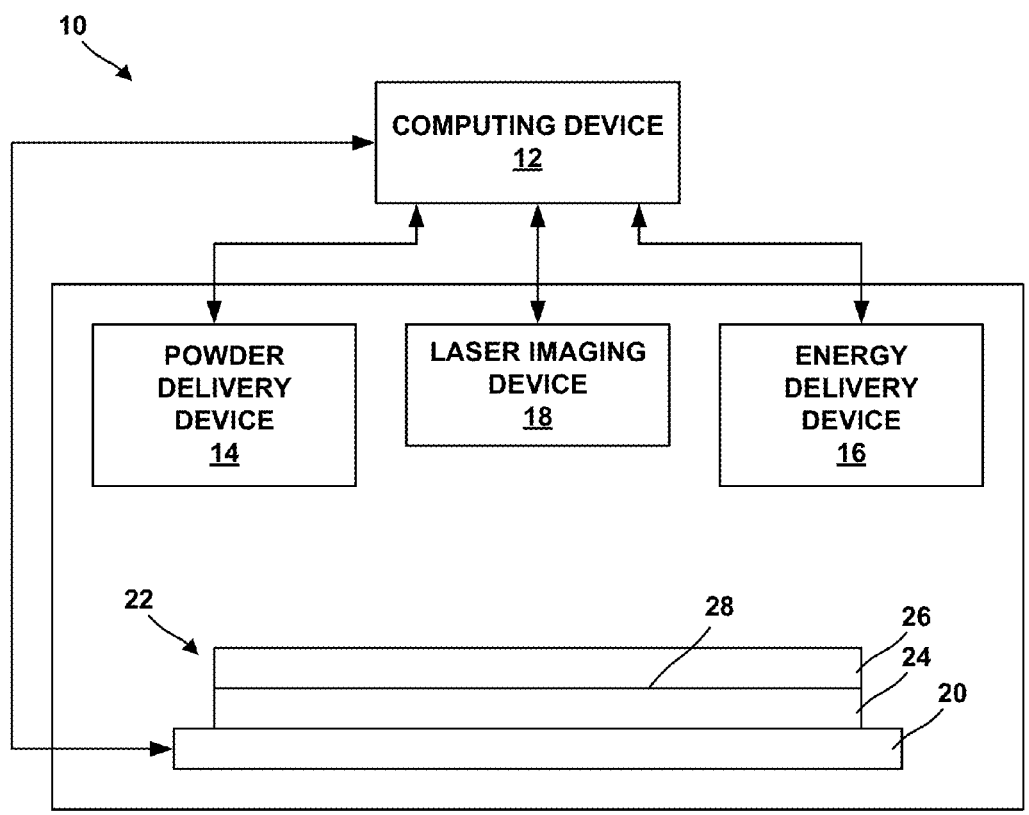
FIG. 1 is a conceptual block diagram illustrating an example system for performing a material addition manufacturing technique including generating a laser image of each layer of the component during the material addition manufacturing technique.

The disclosure generally describes techniques for forming components using additive manufacturing (e.g., material addition or three-dimensional fabrication) techniques. For example, during additive manufacturing techniques in accordance with some examples of this disclosure, a metrology technique, such as laser imaging, may be utilized to image the as-deposited powder or the as-formed layer, each time powder is deposited to form a new layer or each time the layer formation is complete. In this way, an image of each layer may be gathered, allowing traceable metrology of the component during manufacturing and, if the image date is retained after manufacturing, in the event of damage to or failure of the component during use.

During additive manufacturing, a component is built up by adding material to the component in sequential layers. The final component is composed of a plurality of layers of material. In some additive manufacturing techniques for forming components from metals or alloys, a powder may be delivered to a surface of a previously formed layer, and an energy source may be directed at predetermined volumes of the powder to heat the powder and join the powder to the previously formed layer. In some examples, the heating of the powder may cause the powder to sinter or to melt to join to the previously formed layer.

In some examples, excess powder may be delivered to the surface of the previously formed layer, such that not all of the delivered powder is sintered or melted to join the component. In some implementations, this excess powder may be recycled, which may reduce materials costs. However, the powder may undergo changes, such as agglomeration or aging, when recycled. These changes may produce undesired properties if the changed powder is incorporated into a layer of the component.

In some examples, during heating of the powder, excess heat may be delivered to a volume of the powder or the energy source may be slightly misdirected relative to the powder such that the thickness of the layer added to the component may deviate from a desired thickness. If subsequent layers are added without any changes to the process, this may result in defects in the component, such as porosity, inclusions, cracks, lack of fusion, or the like, at the spot where the layer thickness deviated from the desired thickness. For example, if the layer thickness is less than the desired thickness at a location, more powder than expected may be present at that location than would be present if the layer thickness was as desired. When energy is delivered to heat the powder at that location, the amount of energy may be insufficient to sinter or melt all of the powder (due to the excess amount), which may lead to porosity, lack of fusion, or the like.

Because additive manufacturing forms components from a plurality of layers, defects in an earlier-deposited layer may be difficult to detect after manufacturing of the part is complete. Further, even if the defect is detectable after manufacturing, additive manufacturing process may be time consuming, so waiting until completion of manufacturing to detect defects may reduce manufacturing efficiency and thereby increase manufacturing costs. In some examples, if manufacturing deviations (e.g., layer thickness) are detected when the layer is completed, prior to formation of subsequent layers, the additive manufacturing process may be modified to correct the deviation and allow the manufacturing of the component to be completed.

FIG. 1 is a conceptual block diagram illustrating an example system 10 for performing a material addition manufacturing technique including generating a laser image of each layer of the component during the material addition manufacturing technique. In the example illustrated in FIG. 1, system 10 includes a computing device 12, a powder delivery device 14, an energy delivery device 16, a laser imaging device 18, and a stage 20. Computing device 12 is operably connected to powder delivery device 14, energy delivery device 16, laser imaging device 18, and stage 20.

In some examples, stage 20 is movable relative to energy delivery device 16 and/or energy delivery device 16 is movable relative to stage 20. Similarly, stage 20 may be movable relative to powder delivery device 14 and/or powder delivery device 14 may be movable relative to stage 20. For example, stage 20 may be translatable and/or rotatable along at least one axis to position component 22 relative to energy delivery device 16 and/or powder delivery device 14. Similarly, energy delivery device 16 and/or powder delivery device 14 may be translatable and/or rotatable along at least one axis to position energy delivery device 16 and/or powder delivery device 14, respectively, relative to component 22. Stage 20 may be configured to selectively position and restrain component 22 in place relative to stage 20 during manufacturing of component 22.

Powder delivery device 14 may be configured to deliver material to the location of component 22 being formed. The material then may be heated by energy delivered by energy delivery device 16 to add the material to component 22. In some examples, the material may be supplied by powder delivery device 14 in powder form.

In some examples, system 10 may be a blown powder additive manufacturing system. In some such systems, powder delivery device 14 may deliver the powder adjacent to the surface of component 22 by blowing the powder adjacent to the surface, e.g., as a mixture of the powder with a gas carrier. In some examples, powder delivery device 14 thus may be fluidically coupled to a powder source and a gas source, and powder delivery device 14 may include a nozzle or other mechanism for directing the powder to a particular location. In some examples, powder delivery device 14 may be mechanically coupled or attached to energy delivery device 16 to facilitate delivery of powder and energy for heating the powder to substantially the same location adjacent to component 22.

In other examples, system 10 may be a powder bed additive manufacturing system. In some such examples, powder delivery device 14 may deliver the powder adjacent to the surface of component 22 by spreading the powder on the surface of component 22, such that the powder rests on the surface prior to being heated. In some examples of a powder bed additive manufacturing system, powder delivery device 14 may include a device that spreads the powder or can otherwise manipulate the powder to move the powder within system 10.

Energy delivery device 16 may include an energy source, such as a laser source, an electron beam source, plasma source, or another source of energy that may be absorbed by the powder to be added to component 22. Example laser sources include a CO laser, a $CO_2$ laser, a Nd:YAG laser, or the like. In some examples, the energy source may be selected to provide energy with a predetermined wavelength or wavelength spectrum that may be absorbed by the powder material to be added to component 22 during the additive manufacturing technique.

In some examples, energy delivery device 16 also includes an energy delivery head, which is operatively connected to the energy source. The energy delivery head may aim or direct the energy toward predetermined positions adjacent to component 22 during the additive manufacturing technique. As described above, in some examples, the energy delivery head may be movable in at least one dimension (e.g., translatable and/or rotatable) under control of computing device 12 to direct the energy toward a selected location adjacent to component 22.

Laser imaging device 18 may include a laser and a sensor, which senses laser light reflected by the structure being imaged (e.g., the powder or the layer formed as part of component 22). The laser may have a defined wavelength, which may affect the resolution of the laser imaging device 18. In some examples, the wavelength and sensor may be selected such that the resolution of laser imaging device 18 is a great as about 10 microns (e.g., about 6 microns).

In some examples, laser imaging device 18 may be positioned substantially directly above component 22 and may include an interferometer, which provides depth information based on the time from outputting a laser pulse to the sensing of the reflected light. In other examples, laser imaging device 18 may be positioned at an offset with respect to component 22 such that the sensor senses depth information without using an interferometer.

The laser imaging device 18 may produce images that are traceable to a standard, such as a National Institute of Standards and Technology (NIST) standard. This may facilitate use of the images to indicate both integrity of component 22 and dimensional conformity of the as-built component 22 to the digital model on which component 22 is based.

In some examples, laser imaging device 18 may be integral with system 10, e.g., disposed within the enclosure or working area of system 10. In other examples, laser imaging device 18 may be an add-on component to system 10. For example, the enclosure in which the additive manufacturing technique is performed may include a transparent window, and laser imaging device 18 may be positioned outside of the enclosure and may image component 22 through the transparent window.

Although a laser imaging device 18 is described in the examples of this disclosure, in other examples, another metrology device may be utilized to image the powder and/or the layer formed as part of the additive manufacturing technique. For example, another type of light source may be used to image the respective layers of component 22. In some examples, if another type of light source is used to image the respective layers of component 22, component 22 or stage 20 may include one or more features that serve as indicators of scale.

Computing device 12 may include, for example, a desktop computer, a laptop computer, a workstation, a server, a mainframe, a cloud computing system, or the like. Computing device 12 is configured to control operation of system 10, including, for example, powder delivery device 14, energy delivery device 16, laser imaging device 18, and/or stage 20. Computing device 12 may be communicatively coupled to powder delivery device 14, energy delivery device 16, laser imaging device 18, and/or stage 20 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Computing device 12 may be configured to control operation of powder delivery device 14, energy delivery device 16, laser imaging device 18, and/or stage 20 to position component 22 relative to powder delivery device 14, energy delivery device 16, laser imaging device 18, and/or stage 20. For example, as described above, computing device 12 may control stage 20 and powder delivery device 14, energy delivery device 16, and/or laser imaging device 18 to translate and/or rotate along at least one axis to position component 22 relative to powder delivery device 14, energy delivery device 16, and/or laser imaging device 18. Positioning component 22 relative to powder delivery device 14, energy delivery device 16, and/or laser imaging device 18 may include positioning a predetermined surface (e.g., a surface to which material is to be added) of component 22 in a predetermined orientation relative to powder delivery device 14, energy delivery device 16, and/or laser imaging device 18.

In accordance with some examples of this disclosure, computing device 12 may be configured to control system 10 to image a layer of component 22 after the layer has been added to component 22. As shown in FIG. 1, component 22 may include a first layer 24 and a second layer 26. Component 22 in FIG. 1 is simplified in geometry and the number of layers compared to many components formed using additive manufacturing techniques. Although the technique are described herein with respect to component 22 including first layer 24 and second layer 26, the technique may be extended to components 22 with more complex geometry and any number of layers.

Figure 2:
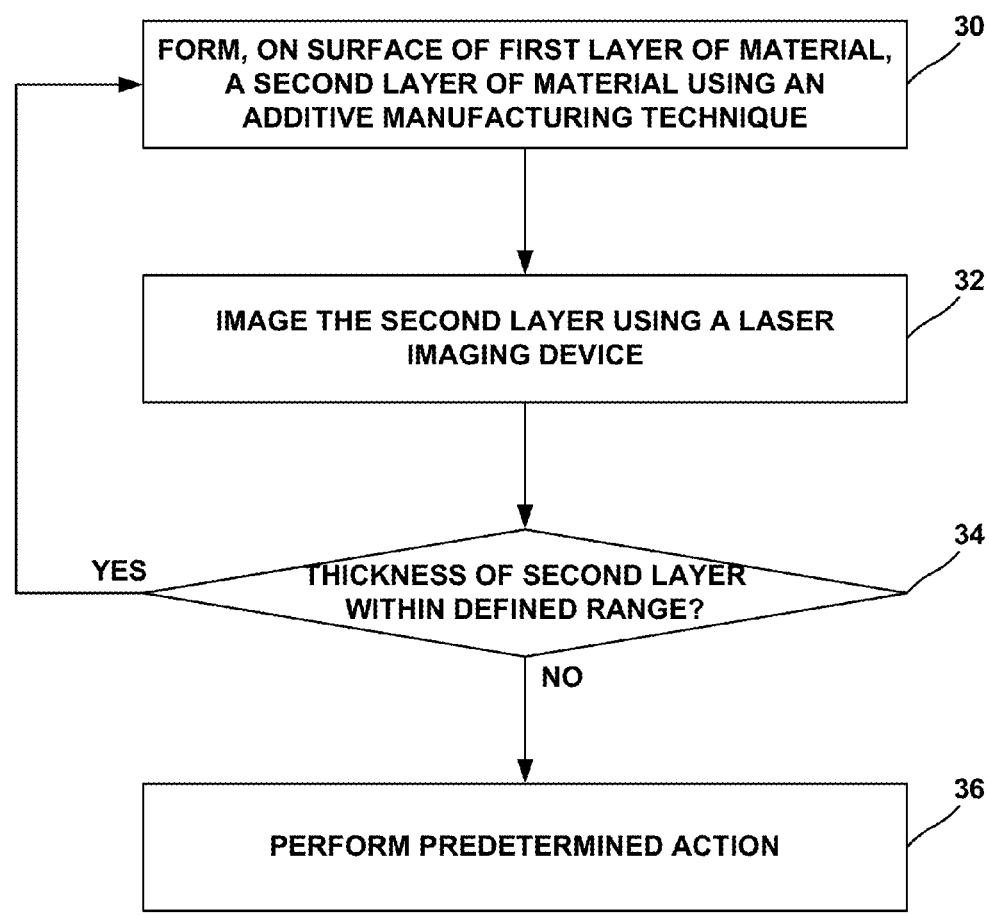
FIG. 2 is a flow diagram illustrating an example technique for forming a component using a material addition technique.

An example technique that may be implemented by system 10 will be described with concurrent reference to FIG. 2. FIG. 2 is a flow diagram illustrating an example technique for forming a component using a material addition technique. Although the technique of FIG. 2 is described with respect to system 10 of FIG. 1, in other examples, the technique of FIG. 2 may be performed by other systems, such as systems including fewer or more components than those illustrated in FIG. 1. Similarly, system 10 may be used to performed other additive manufacturing techniques (e.g., the technique illustrated in FIG. 3).

The technique of FIG. 2 includes forming, on a surface 28 of a first layer of material 24, a second layer of material 26 using an additive manufacturing technique (30). Forming second layer of material 26 on surface 28 of first layer of material 24 may include delivering powder adjacent to or on surface 28 using powder delivery device 14. For example, computing device 12 may control the relative position of powder delivery device 14 and stage 20 to direct powder at or on to surface 28.

Computing device 12 also may control energy delivery device 16 (e.g., an energy delivery head) to direct energy to a volume of the powder adjacent to or on surface 28 to join at least some of the powder to first layer of material 24. In some examples, the amount of energy may be sufficient to melt the powder so that the material flows and forms a substantially dense second layer of material 26. In other examples, the amount of energy may be sufficient to heat the volume of powder so that the powder sinters and joins to first layer of material 24. In either case, computing device 12 may control energy delivery device 16 to deliver a predetermined amount of energy to join a volume of powder to first layer of material 24 and form second layer of material 26.

The technique of FIG. 2 also includes imaging second layer of material 26 using laser imaging device 18 to generate a second layer image (32). Computing device 12 may control laser imaging device 18 to generate the second layer image. The second layer image may include information regarding the thickness of second layer of material 26 in a direction substantially normal to surface 28 of first layer of material 28. The second layer image also may include information regarding the geometry of second layer in other dimensions. In some examples, each layer of material 24 and 26 has a designed thickness and a design tolerance, which may be on the order of thousandths of an inch (e.g., 0.006 inch; about 152.4 micrometers).

The technique of FIG. 2 also may include determining, by computing device 12, based at least in part on the second layer image, whether a thickness of second layer of material 26 is in a defined range of thicknesses (34). For example, the defined range of thicknesses may include the designed thickness plus or minus the design tolerance.

If the thickness of second layer of material 26 is less than the designed thickness by more than the design tolerance, this may result in defects in component 22. For example, the second layer of material 26 being thinner than the designed thickness may indicate that the powder was heated to a temperature higher than a design temperature during the melting or sintering process. This may result in changes to the microstructure of the second layer of material 26 or the first layer of material 24 proximate to the location at which the thickness is less than the design thickness. Changes in microstructure may lead to adverse mechanical properties of component 22 at this location.

As another example, second layer of material 26 being thinner than the designed thickness may lead to porosity, cracks, or lack of fusion when a subsequent layer is formed on second layer of material 26. Because second layer of material 26 is thinner than the designed thickness at this location, additional powder may be present at this location when forming the subsequent layer. If the energy delivered by energy delivery device 16 is substantially constant, the additional powder may not be heated sufficiently to melt or sinter, which may lead to porosity, cracks, or lack of fusion of the powder to second layer of material 26.

Responsive to determining that the thickness of second layer of material 26 is in the defined range of thicknesses (the "YES" branch of decision block 34), the technique of FIG. 2 continues with forming, on a surface of the second layer of material, a third layer of material using the additive manufacturing technique (30).

However, responsive to determining that the thickness of second layer of material 26 is not in the defined range of thicknesses (the "NO" branch of decision block 34), the technique of FIG. 2 include performing, by computing device 12, a predetermined action (36). In some examples, the predetermined action may include ceasing the additive manufacturing technique. In some examples, the predetermined action may include outputting, by computing device 12, an indication that the thickness of second layer of material 26 is outside of the defined range of thicknesses. The indication may include, for example, a visual indication displayed at a display device, an audible indication output using a speaker, or the like, and may alert a technician or user of system 10 that the most recently formed layer includes a thickness deviation.

In some examples, computing device 12 may implement closed-loop control of system 10, such as by modifying one or more process parameters based on the determination that the thickness of second layer of material 26 is not in the defined range of thicknesses. For example, responsive to determining that the thickness of second layer of material 26 is not in the defined range of thicknesses (the "NO" branch of decision block 34), computing device 12 may control energy delivery device 16 to modify a tool path traced by the focal point or focal volume of the energy beam output by energy delivery device 16. The modified tool path may trace a path that adjusts for the deviation in the thickness of second layer of material 26 to reduce a likelihood that porosity, cracks, or lack of fusion occurs at the position with the deviation in thickness.

In some examples, system 10 may perform the technique of FIG. 2 for each layer used to form component 22. At any point in the process, if computing device 12 determines that the thickness of second layer of material 26 is not in the defined range of thicknesses (the "NO" branch of decision block 34), computing device 12 may perform a predetermined action (36). In examples in which the predetermined action includes modifying one or more process parameters based on the determination that the thickness of second layer of material 26 is not in the defined range of thicknesses, the technique may continue by adding a subsequent layer. In examples in which the predetermined action includes ceasing the additive manufacturing technique or outputting the indication that the thickness of second layer of material 26 is outside of the defined range of thicknesses, the technique of FIG. 2 may stop.

In some examples, although not shown in FIG. 2, the technique includes aggregating and correlating the images of generated for each respective layer of component 22 into image data representative of component 22. In some examples, because laser imaging is used to image the respective layers, the aggregated and correlated images may provide a three-dimensional representation of the geometry of the as-built component 22. This three-dimensional representation then may be compared to the design file to identify any geometric variances between the design file and the as-built component, and also may be stored by computing device 12 for later reference, e.g., if component 22 is damaged during use or fails due to a defect.

Figure 3:
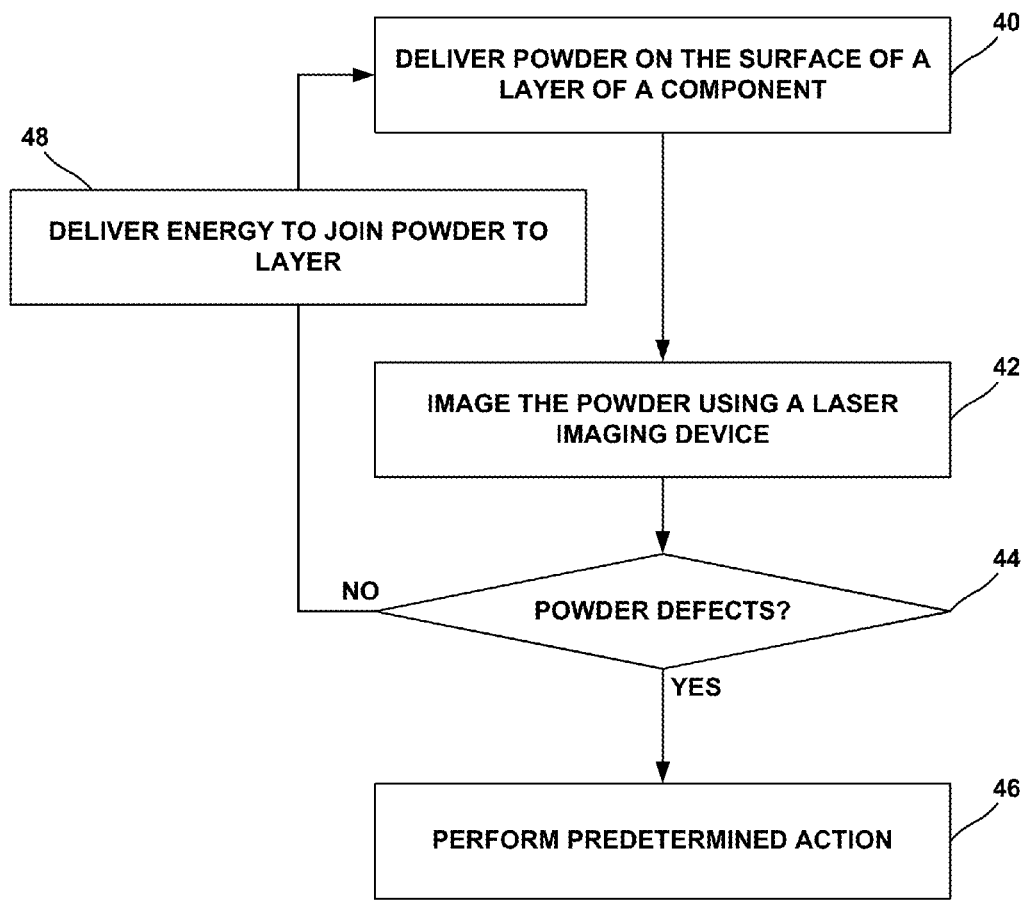
FIG. 3 is a flow diagram illustrating an example technique for forming a component using a material addition technique.

FIG. 3 is a flow diagram illustrating another example technique for forming a component using a material addition technique. Although the technique of FIG. 2 is described with respect to system 10 of FIG. 1, in other examples, the technique of FIG. 2 may be performed by other systems, such as systems including fewer or more components than those illustrated in FIG. 1. Similarly, system 10 may be used to perform other additive manufacturing techniques (e.g., the technique illustrated in FIG. 2).

The technique of FIG. 3 includes delivering a powder on or adjacent to the surface of a layer of a component 22 (40). As described above, in some examples, system 10 may be a blown powder additive manufacturing system, and powder delivery device 14 may deliver the powder on or adjacent to surface 28 of first layer of material 24 using a fluid carrier. In other examples, system 10 may be a powder be an additive manufacturing system, and powder delivery device 14 may deliver the powder on surface 28 of first layer of material 24, e.g., using a mechanism that spreads the powder in a substantially planar layer over first layer of material 24.

Figure 4:
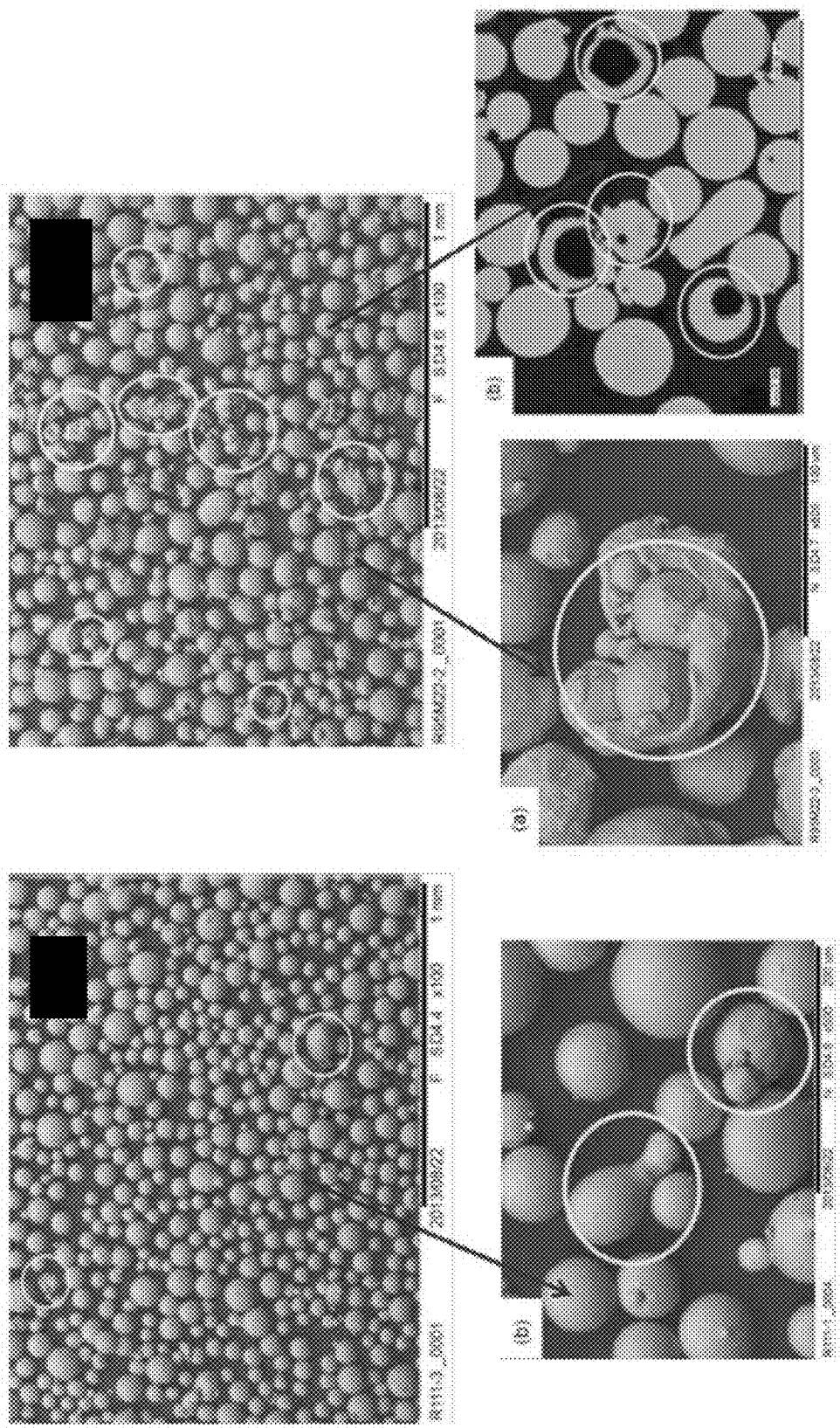
FIG. 4 illustrates a series of example images illustrating powder defects.

The technique of FIG. 3 also includes imaging the powder using laser imaging device 18 to generate a powder image (42). FIG. 4 illustrates a series of example images illustrating powder defects. As shown in FIG. 4, the images illustrate the general shape of powder particles and coverage of the powder on the underlying surface. As shown in the inset pictures, some of the powder particles may include defects, such as agglomeration of multiple particles. In some examples, the powder defects may be due to recycling of the powder over multiple additive steps, which may reduce material waste but may result in damage to the powder. For example, a wiper may be used to spread the powder, and particles of the powder may adhere to the wiper. This may lead to particle agglomeration (on the wiper), and the agglomerated particles may subsequently detach from the wiper and become part of the powder bed. As another example, particles of the powder may adhere to the wiper, and as the wiper spreads powder, the adhered particles may result in formation of a trench in the powder layer. In either example, the non-uniformity of the powder may potentially result in defects if the powder defect is located at a position where the powder is to be incorporated into component 12.

The technique of FIG. 3 also may include determining, by computing device 12, based at least in part on the powder image, whether the powder includes any powder defects (44). In some examples, computing device 12 may be configured to further determine whether any identified powder defects lie in tool path (e.g., the path of the focal point or focal volume of the energy beam output by energy delivery device 16 when delivering energy to add material to component 22). Computing device 12 may be configured to analyze the powder image to identify any agglomerations of particles, trenches, or other powder defects, and associate the powder defect with a location. Computing device 12 then may compare the location of the powder defect with the tool path to determine whether the powder defect lies in the tool path.

Responsive to determining that the powder does not include powder defects (the "NO" branch of decision block 44), the technique of FIG. 3 includes delivering energy with energy delivery device 16 to a volume of the powder to join at least some of the powder to the layer (48). In some examples, the amount of energy may be sufficient to melt the powder so that the material flows and forms a substantially dense second layer of material 26. In other examples, the amount of energy may be sufficient to heat the volume of powder so that the powder sinters and joins to first layer of material 24. In either case, computing device 12 may control energy delivery device 16 to deliver a predetermined amount of energy to join a volume of powder to first layer of material 24 and form second layer of material 26.

The technique of FIG. 3 then may continue with delivering a powder on or adjacent to the surface of a layer of a component 22 (40) and imaging the powder using laser imaging device 18 to generate a powder image (42).

However, responsive to determining that the powder does include powder defects (the "YES" branch of decision block 44), the technique of FIG. 3 includes performing, by computing device 12, a predetermined action (46). In some examples, the predetermined action may include ceasing the additive manufacturing technique. In some examples, the predetermined action may include outputting, by computing device 12, an indication that the powder includes a powder defect. The indication may include, for example, a visual indication displayed at a display device, an audible indication output using a speaker, or the like, and may alert a technician or user of system 10 that the powder includes a powder defect. In some examples, the indication additionally may indicate the type of powder defect (e.g., agglomeration or trench) and/or the location of the powder defect.

In some examples, the predetermined action may include using the wiper or other mechanism to re-introduce the powder, smooth the layer of powder, or move the powder defect from the tool path. In some examples, computing device 12 may control the wiper or other powder delivery device 14 to attempt to ameliorate the powder defect, and, if the amelioration is unsuccessful, may cease the additive manufacturing technique and/or output an indication of the powder defect.

In some examples, although not shown in FIG. 3, the technique includes aggregating and correlating the images of generated for each respective layer of powder. This aggregated and correlated image data may be stored by computing device 12 for later reference, e.g., if component 22 is damaged during use or fails due to a defect.

In some examples, system 10 may implement the techniques of FIGS. 2 and 3 in a single technique. For example, computing device may control powder delivery device 14 to deliver powder on or adjacent to the surface of a layer of a component 22 (40). Computing device 12 then may control laser imaging device 18 to image the powder to generate a powder image (42). Computing device 12 then may determine, based at least in part on the powder image, whether the powder includes any powder defects (44). Responsive to determining that the powder does not include powder defects (the "NO" branch of decision block 44), computing device 12 may control energy delivery device 16 to a volume of the powder to join at least some of the powder to the layer (48). Computing device 12 then may control laser imaging device 18 to image the layer of material 26 to generate a layer image (32), and may determine, based at least in part on the second layer image, whether a thickness of second layer of material 26 is in a defined range of thicknesses (34). Computing device 12 may repeat this general technique for each layer of component 22 and each time powder is deposited on the surface of a previously formed layer. For any layer, if computing device 12 determines that the powder does include powder defects (the "YES" branch of decision block 44), computing device 12 may perform a predetermined action (46). Similarly, for any layer, if computing device 12 determines that the thickness of the layer is not in the defined range of thicknesses (the "NO" branch of decision block 34), computing device 12 may perform a predetermined action (36).

The techniques described in this disclosure may facilitate generation of a record of an as-built component, layer-by-layer, during an additive manufacturing process. The record of the as-build component may include image data including a plurality of images (e.g., one image for each layer used to form the component). The record of the as-built component may be stored by computing device 12 or another computing device, and may be a reference if a defect is discovered during subsequent component testing or during use of the component or if the component is damaged during use of the component.

Because the images are generated layer-by-layer as the component is formed, the images may be used for substantially real time detection of manufacturing variances or defects. For example, the images may be used to determine if the powder is uniformly and smoothly disposed on the surface to which the material is to be added and/or if the powder includes agglomerated clumps of particles, both of which may affect the properties of the component. As another example, the images may be used to determine if the thickness of the most recently added layer is within a defined range. This information may be used to stop the additive manufacturing technique, generate an alarm, or for closed-loop control of the additive manufacturing technique.

In some examples, the images for each respective layer may be aggregated and correlated to produce a fully associative three dimensional model of the as-built component. In some examples, such as when laser scanning is used to image the component, the resulting image data may be compared to the original computer aided design files to verify geometry of the as-built component to the designed component.

By incorporating the imaging of each respective layer into the additive manufacturing technique, the techniques of this disclosure may facilitate quality control of components made using additive manufacturing. In some examples, an enclosure in which the additive manufacturing technique is performed may be filled with powder and only the powder at positions corresponding to the desired component geometry is solidified. The excess (non-solidified) powder may be recycled to lower manufacturing costs. The recycled powder may have changed properties compared to the fresh powder, and controlled and locked parameters in the powder manufacture, machine settings, and movement of the laser on the numerically guided drive mechanisms of the machine tool may result in non-flexible or non-adjustable process settings, which may lead to component defects. When only post-manufacturing testing is used such as x-ray scanning, pressure testing, thermography, or the like, the defects are not detected until after the component has been formed, which results in lost manufacturing time. In contrast, the techniques of this disclosure facilitate detection of potential defects in a layer when the layer is formed.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:
1. A method comprising:
 delivering a powder on a surface of a first layer of material;
 imaging the powder using a laser imaging device to generate a powder image;
 storing, by the computing device, the powder image as an image file for an as-built component including the first layer of material and a second layer of material;
 determining, by the computing device, whether the powder includes a powder defect based at least in part on the powder image;
 responsive to determining that the powder includes the powder defect, performing, by the computing device, a predetermined action; and
 delivering energy to a volume of the powder to join at least some of the powder to the first layer of material and form the second layer of material on the first layer of material.
2. The method of claim 1, wherein performing the predetermined action comprises at least one of:

controlling, by the computing device, a device to remove the powder defect from a tool path in which the powder will be added to the first layer;
outputting, by the computing device, an indication that the powder includes the powder defect; or
controlling, by the computing device, an energy delivery device to direct energy toward a volume of the powder to join at least some of the powder to the first layer.

3. The method of claim 1, further comprising:
imaging the second layer using the laser imaging device to generate a second layer image; and
determining, by a computing device, whether a thickness of the second layer, in a direction substantially normal to the surface of the first layer of material, is within a defined range of thicknesses for the second layer.

4. The method of claim 3, further comprising:
forming, on a surface of the second layer of material, a third layer of material using the additive manufacturing process;
imaging the third layer using the laser imaging device to generate a third layer image;
determining, by the computing device, whether a thickness of the third layer, in a direction substantially normal to the surface of the second layer of material, is within a defined range of thickness for the third layer.

5. The method of claim 3, further comprising:
responsive to determining that the thickness of the second layer is outside the defined range of thickness for the second layer, performing, by the computing device, a predetermined action, wherein the predetermined action comprises at least one of:
outputting, by the computing device, an indication that the thickness of the second layer is outside of the defined range of thickness; or
modifying, by the computing device, a tool path used to form a third layer on a surface of the second layer.

6. The method of claim 3, further comprising storing, by the computing device, the second layer image as an image file for an as-built component including the first layer of material and the second layer of material.

7. A system comprising:
a powder delivery device;
an energy delivery device;
a laser imaging device; and
a computing device configured to:
control the powder delivery device to deliver powder on a surface of a first layer of material;
prior to controlling the energy delivery device to deliver energy, control the laser imaging device to image the powder to generate a powder image;
store the powder image as an image file for an as-built component including the first layer of material and a second layer of material;
determine whether the powder includes a powder defect based at least in part on the powder image;
responsive to determining that the powder includes the powder defect, perform a predetermined action; and
control the energy delivery device to deliver energy to a volume of the powder to join at least some of the powder to the first layer of material and form the second layer of material on the first layer of material.

8. The system of claim 7, wherein predetermined action comprises at least one of:
controlling a device to remove the powder defect from a tool path in which the powder will be added to the first layer;
outputting an indication that the powder includes the powder defect; or
controlling the energy delivery device to direct energy toward a volume of the powder to join at least some of the powder to the first layer.

9. The system of claim 7, wherein the computing device is further configured to:
control the laser imaging device to image the second layer to generate a second layer image; and
determine whether a thickness of the second layer, in a direction substantially normal to the surface of the first layer of material, is within a defined range of thickness for the second layer.

10. The system of claim 9, wherein the computing device is further configured to:
control the powder delivery device to deliver powder on a surface of the second layer;
control the energy delivery device to deliver energy to a volume of the powder to join at least some of the powder to the second layer of material and form a third layer;
control the laser imaging device to image the third layer to generate a third layer image; and
determine whether a thickness of the third layer, in a direction substantially normal to the surface of the second layer of material, is within a defined range of thickness for the third layer.

11. The system of claim 9, wherein the computing device is further configured to, responsive to determining that the thickness of the second layer is outside the defined range of thickness for the second layer, performing, by the computing device, a predetermined action, wherein the predetermined action comprises at least one of:
outputting an indication that the thickness of the second layer is outside of the defined range of thickness; or
modifying a tool path used to form a third layer on a surface of the second layer.

12. The system of claim 9, wherein the computing device is further configured to store the second layer image as an image file for an as-built component including the first layer of material and the second layer of material.

13. A computer-readable storage device comprising instructions that, when executed, configure one or more processors of a computing device to:
control a powder delivery device to deliver powder on a surface of a first layer of material;
prior to controlling an energy delivery device to deliver energy, control the laser imaging device to image the powder to generate a powder image;
store the powder image as an image file for an as-built component including the first layer of material and a second layer of material;
determine whether the powder includes a powder defect based at least in part on the powder image;
responsive to determining that the powder includes the powder defect, perform a predetermined action; and
control the energy delivery device to deliver energy to a volume of the powder to join at least some of the powder to the first layer of material and form the second layer of material on the first layer of material.

14. The computer-readable storage device of claim 13, wherein the predetermined action comprises at least one of:
controlling a device to remove the powder defect from a tool path in which the powder will be added to the first layer;
outputting an indication that the powder includes the powder defect; or controlling the energy delivery device to direct energy toward a volume of the powder of the material to join at least some of the powder to the first layer.

15. The computer-readable storage device of claim 13, further comprising instructions that, when executed, configure one or more processors of the computing device to:
control a laser imaging device to image the second layer to generate a second layer image; and
determine whether a thickness of the second layer, in a direction substantially normal to the surface of the first layer of material, is within a defined range of thickness for the second layer.

16. The computer-readable storage device of claim 15, further comprising instructions that, when executed, configure one or more processors of the computing device to, responsive to determining that the thickness of the second layer is outside the defined range of thickness for the second layer, perform a predetermined action, and wherein the predetermined action comprises at least one of:
outputting an indication that the thickness of the second layer is outside of the defined range of thickness; or
modifying a tool path used to form a third layer on a surface of the second layer.

17. The computer-readable storage device of claim 15, further comprising instructions that, when executed, configure one or more processors of the computing device to:
store the second layer image as an image file for an as-built component including the first layer of material and the second layer of material.

* * * * *